(12) United States Patent
Sakakibara et al.

(10) Patent No.: US 11,518,110 B2
(45) Date of Patent: Dec. 6, 2022

(54) ADHESIVE APPLICATION APPARATUS

(71) Applicant: MOMENTIVE PERFORMANCE MATERIALS JAPAN LLC, Tokyo (JP)

(72) Inventors: Makoto Sakakibara, Tokyo (JP); Hiroyuki Ueno, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 17/318,156

(22) Filed: May 12, 2021

(65) Prior Publication Data

US 2021/0260833 A1 Aug. 26, 2021

Related U.S. Application Data

(63) Continuation of application No. PCT/JP2019/044153, filed on Nov. 11, 2019.

(30) Foreign Application Priority Data

Nov. 15, 2018 (JP) .............................. JP2018-214839

(51) Int. Cl.
*B32B 41/00* (2006.01)
*B29C 65/48* (2006.01)
(Continued)

(52) U.S. Cl.
CPC ........ *B29C 65/4845* (2013.01); *B29C 65/524* (2013.01); *B29L 2031/3475* (2013.01); *G02F 1/133528* (2013.01)

(58) Field of Classification Search
CPC ............... B29C 65/4845; B29C 65/524; B29L 2031/3475; G02F 1/133528; B05C 9/10; B05C 5/00; B05C 5/02
(Continued)

(56) References Cited

U.S. PATENT DOCUMENTS

| 5,227,637 A | 7/1993 | Herold et al. |
| 2009/0027592 A1 | 1/2009 | Motomatsu |
| 2016/0250877 A1 | 9/2016 | Schlatterbeck |

FOREIGN PATENT DOCUMENTS

| DE | 10045994.0 A | 4/2002 |
| DE | 10 2010 013 342 A1 | 10/2011 |

(Continued)

OTHER PUBLICATIONS

Chinese Office Action issued for CN Appl. Ser. No. 201980075133.6 dated May 18, 2022 (13 pages).
(Continued)

*Primary Examiner* — Michael N Orlando
*Assistant Examiner* — Joshel Rivera
(74) *Attorney, Agent, or Firm* — Foley & Lardner LLP (57) ABSTRACT

There is provided an adhesive application apparatus capable of efficiently applying an adhesive without inhibiting curing of the adhesive. An adhesive application apparatus of the present invention includes a mounting table 10, an adhesive dosing unit 20, and an ultraviolet irradiation unit 30, and it applies a delayed-ultraviolet-curable adhesive 200 to a surface of a panel 100. The panel 100 is mounted on a mounting surface S10 of the mounting table 10. The adhesive dosing unit 20 applies the adhesive 200 to the surface of the panel 100 mounted on the mounting table 10 by discharging the adhesive 200 from an adhesive dosing port H20. The ultraviolet irradiation unit 30 irradiates the adhesive 200 dosed from the adhesive dosing port H20 with ultraviolet light L. Here, the ultraviolet irradiation unit 30 irradiates the adhesive 200 with the ultraviolet light L along the mounting surface S10 before the adhesive 200 dosed from the adhesive dosing port H20 is applied to the surface of the panel 100.

14 Claims, 9 Drawing Sheets

(51) Int. Cl.
*B29C 65/52* (2006.01)
*B29L 31/34* (2006.01)
*G02F 1/1335* (2006.01)

(58) Field of Classification Search
USPC .................. 156/60, 64, 350, 351, 378, 379
See application file for complete search history.

(56) References Cited

FOREIGN PATENT DOCUMENTS

| | | |
|---|---|---|
| DE | 10 2019 102 089 A1 | 8/2019 |
| EP | 0 279 199 A2 | 8/1988 |
| GB | 2 491 643 | 12/2012 |
| JP | 2001-079488 A | 3/2001 |
| JP | 2004-170526 A1 | 6/2004 |
| JP | 2006-263592 A | 10/2006 |
| JP | 2009-031432 A | 2/2009 |
| JP | 2012-071281 A | 4/2012 |
| JP | 2016-028801 A | 3/2016 |
| WO | WO-2015/071269 A1 | 5/2015 |

OTHER PUBLICATIONS

European Search Report issued for EP Appl. Ser. No. 19885836.7 dated Jun. 20, 2022 (10 pages).

ADHESIVE APPLICATION APPARATUS

CROSS-REFERENCE TO RELATED APPLICATIONS

The present application is a continuation application of International Application No. PCT/JP2019/044513, filed Nov. 11, 2019, which claims priority to Japanese Patent Application No. 2018-214839, filed Nov. 15, 2018. The contents of these applications are incorporated herein by reference in their entirety.

FIELD

The present invention relates to an adhesive application apparatus.

BACKGROUND

In recent years, flat panel displays, such as a liquid crystal panel, have been used in a variety of devices, including computers and televisions. For example, they are used in portable devices such as smart phones and tablet personal computers, as well as in navigation systems and meters in automobiles and other transportation equipment.

A flat panel display is formed in a manner that, for example, to a liquid crystal display panel, another panel such as a polarizing panel, a touch sensor panel, or a protection panel (front plate) is bonded by using an adhesive. The adhesive is an optically transparent resin, and it is, for example, an acrylic resin, a urethane resin, or a silicone resin. Since the adhesive made of silicone has excellent durability in particular, it is suitably used in an apparatus that is used under a severe environment, such as a transportation apparatus including an automobile or the like.

As the adhesive, a tape-type adhesive, a heat setting adhesive, an ultraviolet curable adhesive, and the like are generally used. Among these, the ultraviolet curable adhesive cures quickly, so that it can be suitably used in terms of productivity. Here, normally, ultraviolet irradiation is performed in a state where a pair of adherends (a liquid crystal display panel and a polarizing panel, for example) are bonded together with the ultraviolet curable adhesive interposed therebetween. Accordingly, if, for example, the adherend shields ultraviolet light and there is a part in the ultraviolet curable adhesive which is not irradiated with the ultraviolet light, the non-irradiated part is not cured, and thus the bonding is sometimes performed insufficiently.

In order to solve the above-described problems, it is being considered to use a delayed-ultraviolet-curable adhesive. In this case, for example, the delayed-ultraviolet-curable adhesive is applied to one adherend (a polarizing panel, for example), and then the adhesive is irradiated with ultraviolet light. After that, to the one adherend, the other adherend (a liquid crystal display panel, for example) is bonded via the adhesive after being irradiated with the ultraviolet light. Subsequently, curing of the delayed-ultraviolet-curable adhesive proceeds after the performance of bonding, and curing of the whole is carried out.

However, when the adherend is irradiated with the ultraviolet light, alteration sometimes occurs in the adherend. Further, there is a case where a substance that inhibits curing of the adhesive is generated by the alteration. For example, when a polarizing panel is irradiated with ultraviolet light in a case where the delayed-ultraviolet-curable adhesive contains a platinum catalyst (bis (acetylacetonate) platinum (II) or the like) that exhibits a hydrosilylation reaction activity when ultraviolet light is applied thereto, a substance to be a catalytic poison is sometimes generated in the polarizing panel, and thus there is a possibility that curing of the adhesive is inhibited.

Further, in a case where an adhesive is irradiated with ultraviolet light at an inner portion of a dosing part, and the adhesive after being irradiated with the ultraviolet light is dosed to an adherend, curing of the adhesive sometimes occurs at the inner portion of the dosing part. Consequently, there is a case where it is difficult to uniformly apply the adhesive and thus it is not easy to efficiently apply the adhesive.

As described above, when a delayed-ultraviolet-curable adhesive is applied to a surface of an adherend (a panel composing a flat panel display, or the like), it is sometimes not easy to efficiently apply the adhesive without inhibiting curing of the adhesive.

Therefore, an objective problem to be solved by the present invention is to provide an adhesive application apparatus capable of efficiently applying an adhesive without inhibiting curing of the adhesive.

SUMMARY OF THE INVENTION

An adhesive application apparatus of the present invention includes a mounting table, an adhesive dosing unit, and an ultraviolet irradiation unit, and it applies a delayed-ultraviolet-curable adhesive to a surface of a panel. The panel is mounted on a mounting surface of the mounting table. The adhesive dosing unit applies the adhesive to the surface of the panel mounted on the mounting table by dosing the adhesive from an adhesive dosing port. The ultraviolet irradiation unit irradiates the adhesive dosed from the adhesive dosing port with ultraviolet light. Here, the ultraviolet irradiation unit irradiates the adhesive with the ultraviolet light along the mounting surface before the adhesive dosed from the adhesive dosing port is applied to the surface of the panel.

According to the present invention, it is possible to provide an adhesive application apparatus capable of efficiently applying an adhesive without inhibiting curing of the adhesive.

DESCRIPTION OF THE EMBODIMENTS

Hereinafter, embodiments of the invention will be explained while using the drawings. Note that the invention is not limited to the contents of the drawings. Further, the drawings are schematic, and ratios of dimensions of respective parts and so on are not always the same as actual ones. In addition to that, each embodiment is one example, and omission, replacement, change, and the like can be appropriately carried out.

First Embodiment

[A] Configuration of Adhesive Application Apparatus

A configuration of an adhesive application apparatus according to a first embodiment will be explained by using FIG. 1, FIG. 2, and FIG. 3.

Figure 1:
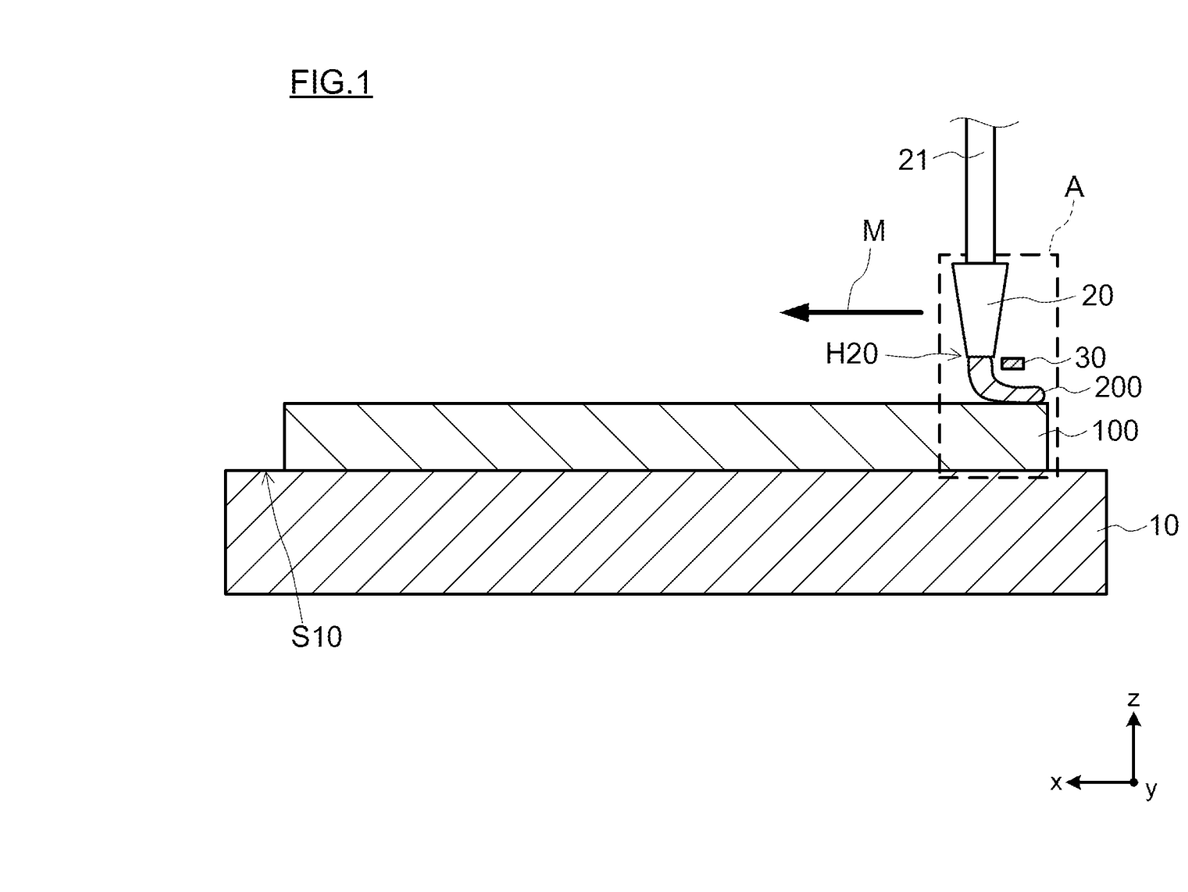
FIG. 1 is a view schematically illustrating a substantial part of a configuration of an adhesive application apparatus according to a first embodiment.

Here, FIG. 1 illustrates a cross section along a vertical plane (xz plane), in which a longitudinal direction is a vertical direction z, a lateral direction is a first horizontal direction x, and a direction orthogonal to the paper sheet is a second horizontal direction y. FIG. 2 illustrates a top surface along a horizontal plane (xy plane), in which a longitudinal direction is the second horizontal direction y, a lateral direction is the first horizontal direction x, and a direction orthogonal to the paper sheet is the vertical direction z. FIG. 3 illustrates a region A illustrated in FIG. 1 in an enlarged manner.

Figure 2:
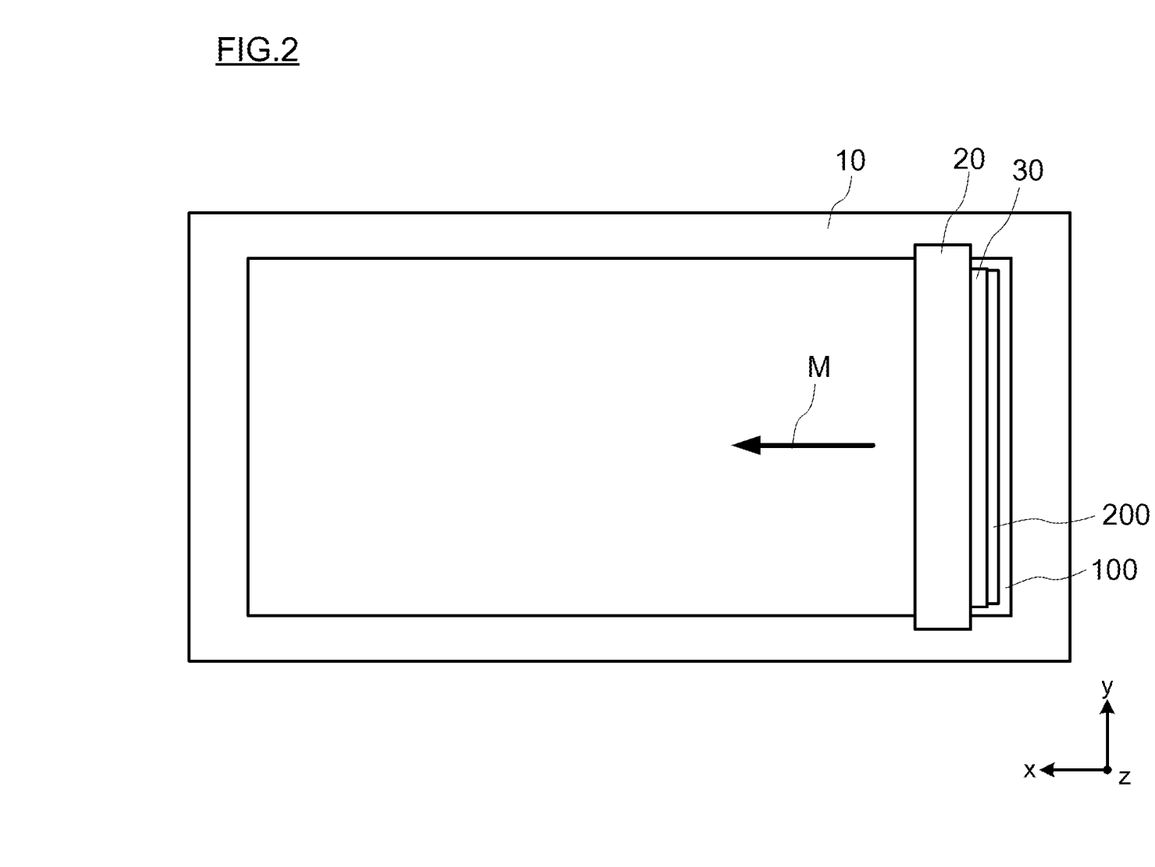
FIG. 2 is a view schematically illustrating a substantial part of the configuration of the adhesive application apparatus according to the first embodiment.

As illustrated in FIG. 1 and FIG. 2, the adhesive application apparatus of the present embodiment includes a mounting table 10, an adhesive dosing unit 20, and an ultraviolet irradiation unit 30, and it is configured to apply a delayed-ultraviolet-curable adhesive 200 to a surface of a panel 100 which is an adherend. Respective parts that compose the adhesive application apparatus of the present embodiment will be explained in order.

[A-1] Mounting Table 10

As illustrated in FIG. 1 and FIG. 2, the mounting table 10 has a mounting surface S10 for mounting the panel 100 thereon. In the present embodiment, the mounting surface S10 is a rectangular-shaped surface along the horizontal plane (xy plane), and the panel 100 being a rectangular-shaped plate body is mounted thereon. For example, a polarizing panel is mounted, as the panel 100, on the mounting surface S10.

[A-2] Adhesive Dosing Unit 20

As illustrated in FIG. 1 and FIG. 2, the adhesive dosing unit 20 is configured to apply the adhesive 200 to the surface of the panel 100 mounted on the mounting table 10, by dosing the adhesive 200 from an adhesive dosing port H20. Here, the adhesive dosing unit 20 composes a dispenser or a die coater, for example, and it doses, from the adhesive dosing port H20, the adhesive 200 fed by a pump (whose illustration is omitted) from an adhesive tank (whose illustration is omitted) via an adhesive pipe 21. For example, a silicone-based delayed-ultraviolet-curable adhesive (SILOPREN UV GEL 100 (A) (B) mixed solution manufactured by Momentive Performance Materials Inc., or the like) is dosed as the adhesive 200.

In the present embodiment, the adhesive dosing port H20 of the adhesive dosing unit 20 extends in a line shape in the second horizontal direction y. Further, the adhesive dosing unit 20 includes a moving mechanism (whose illustration is omitted) that moves in the first horizontal direction x, and respective parts are controlled by a controller (whose illustration is omitted) so that the adhesive dosing unit 20 moves in the first horizontal direction x in a state where the adhesive 200 is dosed at a constant discharge amount from the adhesive dosing port H20.

[A-3] Ultraviolet Irradiation Unit 30

Figure 3:
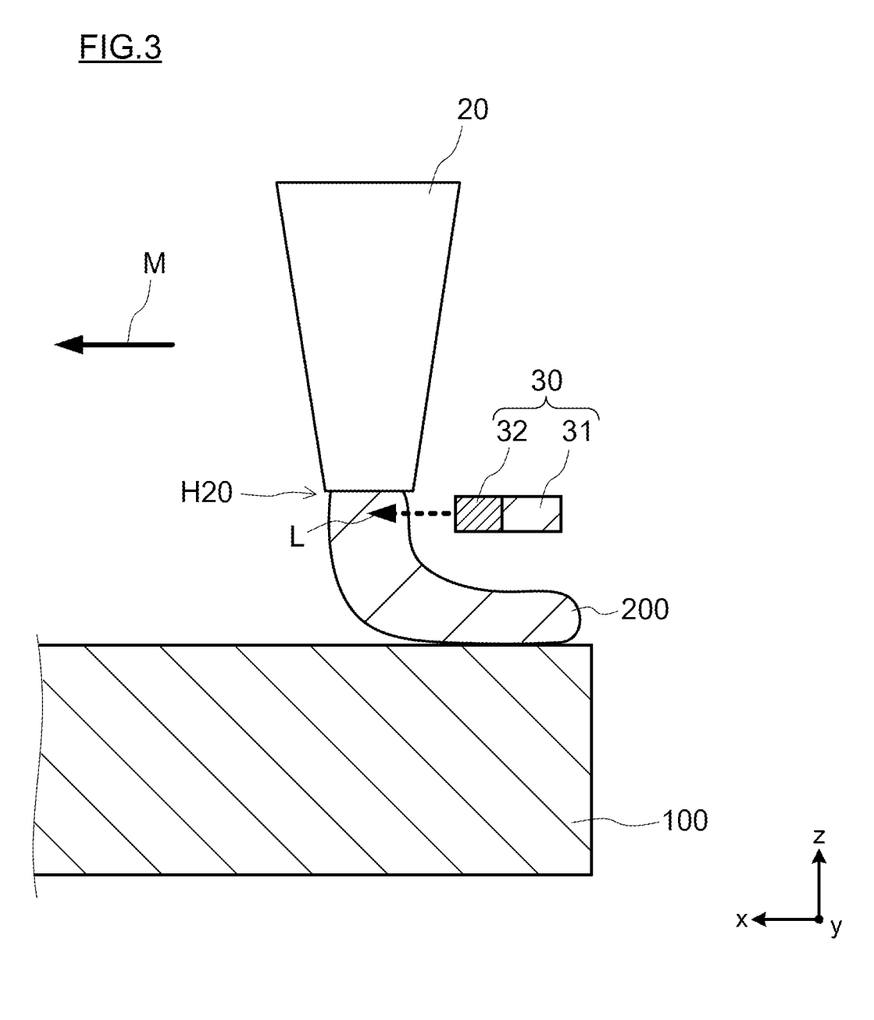
FIG. 3 is a view schematically illustrating a substantial part of the configuration of the adhesive application apparatus according to the first embodiment.

As illustrated in FIG. 1, FIG. 2, and FIG. 3, the ultraviolet irradiation unit 30 is provided for irradiating the adhesive 200 dosed from the adhesive dosing port H20 with ultraviolet light L. Here, the ultraviolet irradiation unit 30 irradiates the adhesive 200 with the ultraviolet light L along the mounting surface S10 before the adhesive 200 dosed from the adhesive dosing port H20 is applied to the surface of the panel 100. The ultraviolet irradiation unit 30 performs irradiation of the ultraviolet light L so that irradiation energy becomes 3000 mJ/cm$^2$, for example.

In the present embodiment, the ultraviolet irradiation unit 30 has an ultraviolet light source 31 and an ultraviolet transmission part 32, as illustrated in FIG. 3. In the ultraviolet irradiation unit 30, the ultraviolet light source 31 includes, for example, an ultraviolet lamp or an ultraviolet laser, and it emits ultraviolet light. The ultraviolet transmission part 32 includes an optical fiber, for example, and it is configured to transmit the ultraviolet light L generated by the ultraviolet light source 31. Further, in the present embodiment, the adhesive 200 is irradiated with the ultraviolet light L transmitted by the ultraviolet transmission part 32, along the mounting surface S10.

In the ultraviolet irradiation unit 30, the ultraviolet transmission part 32 extends in a line shape in the second horizontal direction y, and the unit is configured to make the ultraviolet light L emitted along the second horizontal direction y travel along the first horizontal direction x. Further, although the illustration is omitted, the ultraviolet irradiation unit 30 is fixed to the adhesive dosing unit 20, and it is configured to move in the first horizontal direction x together with the adhesive dosing unit 20.

[B] Method of Using Adhesive Application Apparatus

An operation when applying the delayed-ultraviolet-curable adhesive 200 to the surface of the panel 100 by using the above-described adhesive application apparatus, will be explained by using FIG. 4 and FIG. 5 together with FIG. 1.

When the application of the adhesive 200 is carried out, the panel 100 is first mounted on the mounting surface S10 of the mounting table 10, as illustrated in FIG. 1. For example, a polarizing panel is mounted as the panel 100. Subsequently, the adhesive dosing unit 20 starts the dosing of the adhesive 200 at one end side in the first horizontal direction x, to thereby supply the adhesive 200 to the surface of the panel 100 mounted on the mounting surface S10. At this time, the adhesive 200 is irradiated with the ultraviolet light L from the ultraviolet irradiation unit 30 along the mounting surface S10 (refer to FIG. 3).

Figure 4:
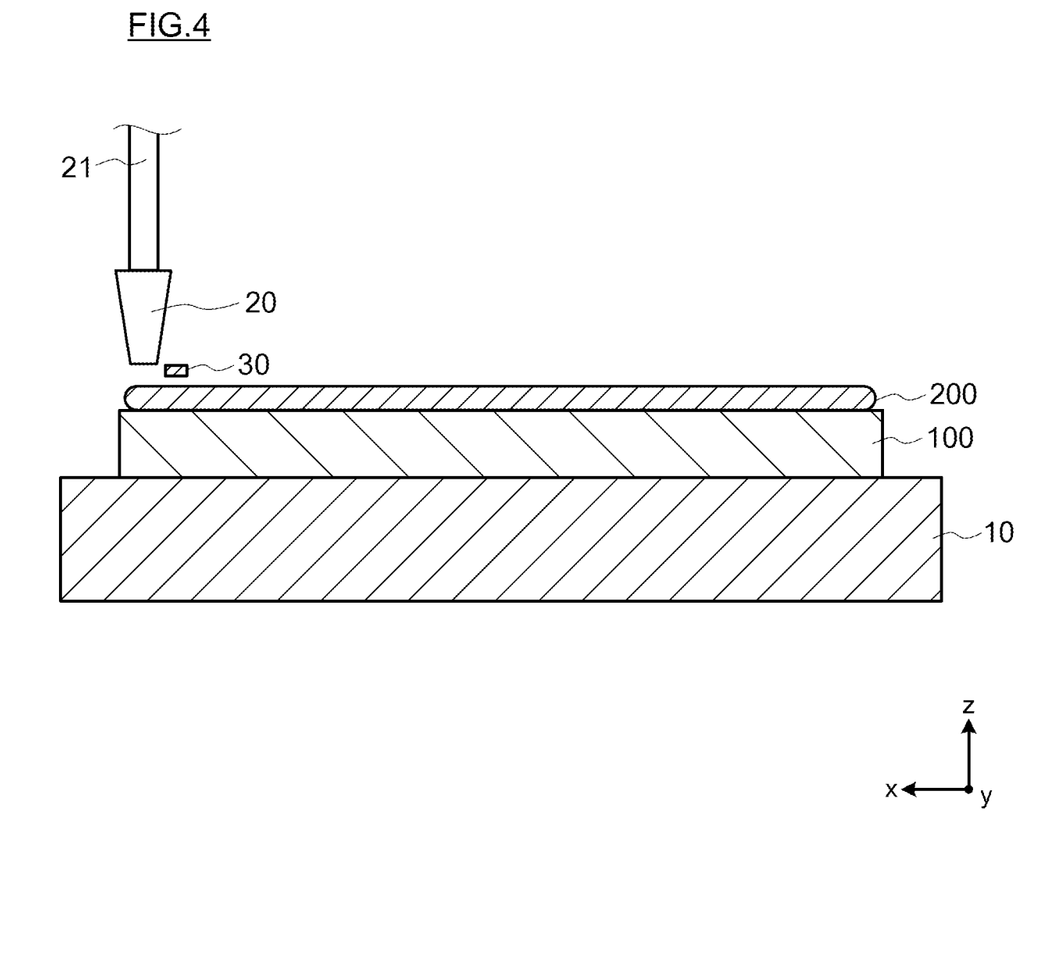
FIG. 4 is a view used for explaining a method of using the adhesive application apparatus according to the first embodiment.

Further, as illustrated in FIG. 4, in a state where the discharge of the adhesive 200 and the irradiation of the ultraviolet light L are being carried out, the adhesive dosing unit 20 and the ultraviolet irradiation unit 30 move from the one end side to the other end side in the first horizontal direction x. Consequently, there is created a state where the adhesive 200 after being irradiated with the ultraviolet light L is applied to the surface of the panel 100.

Figure 5:
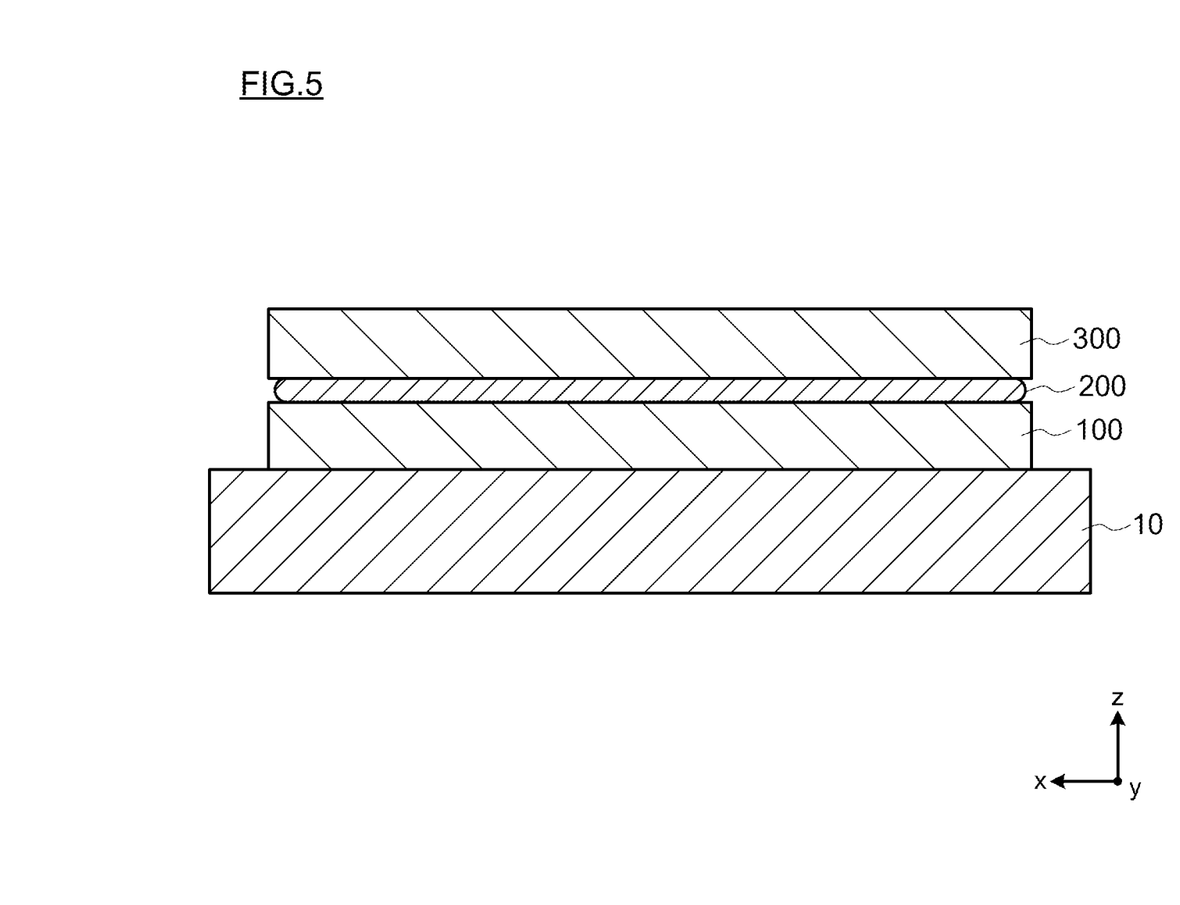
FIG. 5 is a view used for explaining the method of using the adhesive application apparatus according to the first embodiment.

After that, as illustrated in FIG. 5, the panel 100 and another panel 300 are bonded together so that a surface of the other panel 300 faces the surface of the panel 100 via the adhesive 200. For example, the panel 300 being a liquid crystal display panel is bonded to the panel 100 being the polarizing panel. Since the adhesive 200 is the delayed-ultraviolet-curable adhesive, curing proceeds after the performance of bonding, and curing of the whole is carried out.

[C] Summary (Operation, Effect, and so on)

As described above, in the adhesive application apparatus of the present embodiment, the ultraviolet irradiation unit 30 irradiates the adhesive 200 with the ultraviolet light L along the mounting surface S10 before the adhesive 200 dosed from the adhesive dosing port H20 is applied to the surface of the panel 100. Accordingly, in the present embodiment, when irradiating the adhesive 200 with the ultraviolet light L, the panel 100 being the polarizing panel, for example, is unlikely to be irradiated with the ultraviolet light L. Therefore, in the present embodiment, alteration of the panel 100 due to the irradiation of the ultraviolet light L is suppressed, and thus it is possible to prevent a substance that inhibits the curing of the adhesive 200 from being generated by the alteration of the panel 100.

For example, when the polarizing panel being the panel 100 is irradiated with ultraviolet light, a substance to be a catalytic poison with respect to a catalyst contained in the delayed-ultraviolet-curable adhesive 200 is sometimes generated in the polarizing panel. However, in the present embodiment, since it is possible to suppress the irradiation of ultraviolet light with respect to the polarizing panel being the panel 100, the curing of the adhesive 200 is unlikely to be inhibited.

In addition to that, in the present embodiment, the ultraviolet irradiation unit 30 includes the ultraviolet transmission part 32 that transmits the ultraviolet light L generated by the ultraviolet light source 31, and the adhesive 200 is irradiated with the ultraviolet light L transmitted by the ultraviolet transmission part 32 along the mounting surface S10. Accordingly, in the present embodiment, the adhesive 200 is irradiated, in a highly efficient manner, with the ultraviolet light L generated by the ultraviolet light source 31 via the ultraviolet transmission part 32, so that it is possible to more effectively prevent the panel 100 from being irradiated with the ultraviolet light L generated by the ultraviolet light source 31.

[D] Modified Example

In the above-described embodiment, the explanation was given of the case where the mounting table 10 is a stationary body and the adhesive dosing unit 20 and the ultraviolet irradiation unit 30 are movable bodies, but the embodiment is not limited to this. It is also possible that the mounting table 10 is a movable body and the adhesive dosing unit 20 and the ultraviolet irradiation unit 30 are stationary bodies. Specifically, it is only required to configure such that the adhesive dosing unit 20 and the ultraviolet irradiation unit 30 move in a relative manner with respect to the mounting table 10.

In the above-described embodiment, the explanation was given of the case where the ultraviolet irradiation unit 30 includes the ultraviolet transmission part 32 such as an optical fiber, in addition to the ultraviolet light source 31, but the embodiment is not limited to this. It is also possible that the ultraviolet irradiation unit 30 does not include the ultraviolet transmission part 32 such as the optical fiber.

In the above-described embodiment, the explanation was given of the case where the panel 100 to be mounted on the mounting surface S10 is the polarizing panel, but the embodiment is not limited to this. It is also possible that another panel such as a liquid crystal display panel, a touch sensor panel, a protection panel (front plate), or an organic electroluminescence (EL) panel is the adherend. Even in a case where alteration of the panel 100 other than the polarizing panel occurs due to the irradiation of the ultraviolet light L, the aforementioned preferable effect can be exhibited in a similar manner by using the above-described adhesive application apparatus.

Second Embodiment

[A] Configuration of Adhesive Application Apparatus

Figure 6:
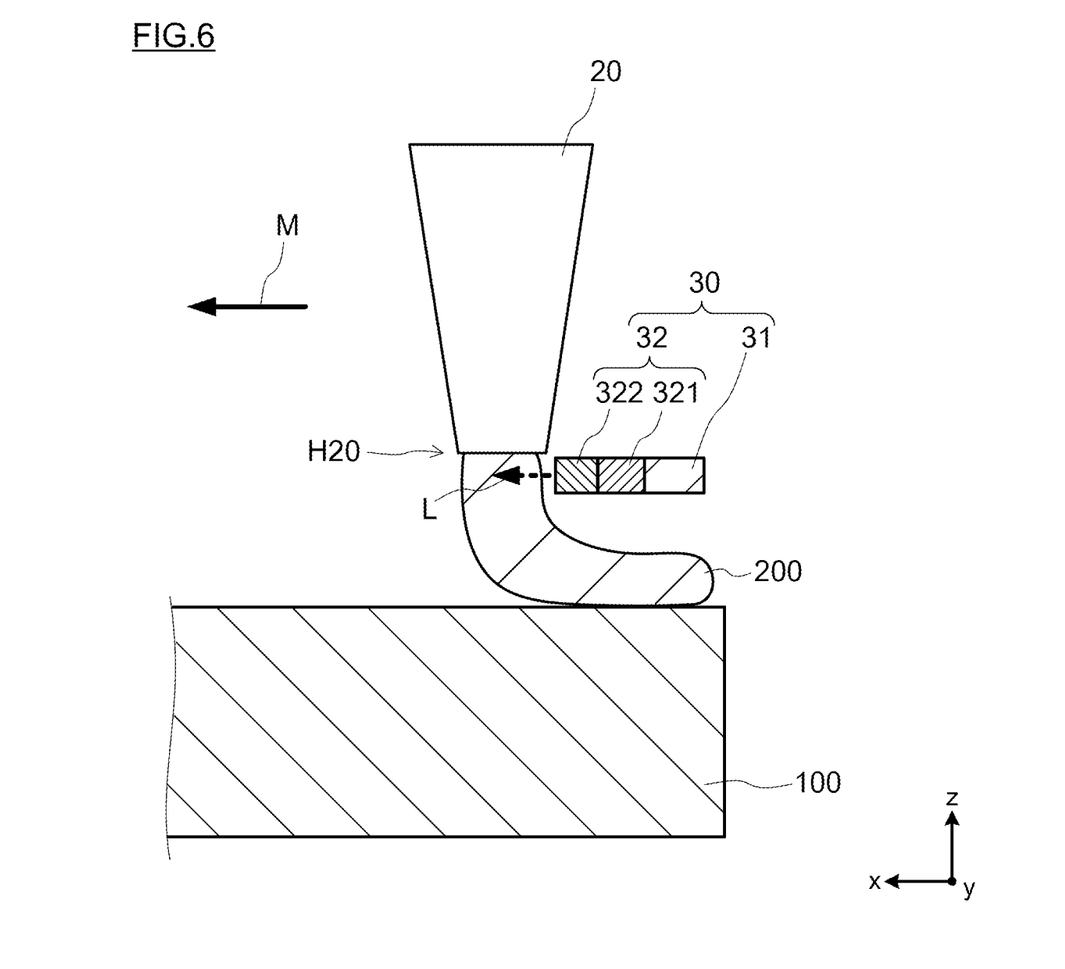
FIG. 6 is a view schematically illustrating a substantial part of a configuration of an adhesive application apparatus according to a second embodiment.

A configuration of an adhesive application apparatus according to a second embodiment will be explained by using FIG. 6. FIG. 6 illustrates parts similar to those in FIG. 3.

As illustrated in FIG. 6, in the present embodiment, the ultraviolet transmission part 32 that composes the ultraviolet irradiation unit 30 is different from that of the first embodiment (refer to FIG. 3). Except for this point and relevant points, the present embodiment is similar to the first embodiment. For this reason, explanation of overlapped matter will be appropriately omitted.

As illustrated in FIG. 6, the ultraviolet transmission part 32 includes a first ultraviolet transmission path 321 and a second ultraviolet transmission path 322, and is configured such that the ultraviolet light L generated by the ultraviolet light source 31 is transmitted to the second ultraviolet transmission path 322 via the first ultraviolet transmission path 321. Here, the second ultraviolet transmission path 322 is formed of a material in which a value of refractive index is closer to that of the adhesive 200, when compared to that of the first ultraviolet transmission path 321 with respect to that of the adhesive 200. Further, the ultraviolet transmission part 32 is configured to prevent occurrence of total reflection of the ultraviolet light L at an interface between the first ultraviolet transmission path 321 and the second ultraviolet transmission path 322.

For example, the respective first ultraviolet transmission path 321 and second ultraviolet transmission path 322 are formed of the following combination of materials.

First ultraviolet transmission path 321 . . . quartz glass (refractive index n=1.41 to 1.56)

Second ultraviolet transmission path 322 . . . optical glass (refractive index n=1.43 to 1.84)

Adhesive 200 . . . silicone-based delayed-ultraviolet-curable adhesive (refractive index n=1.35 to 1.65)

[B] Summary (Operation, Effect, and so on)

As described above, in the ultraviolet light source 31 of the present embodiment, the second ultraviolet transmission path 322 has the value of refractive index which is closer to that of the adhesive 200, when compared to that of the first ultraviolet transmission path 321 with respect to that of the adhesive 200. Accordingly, in the present embodiment, the adhesive 200 is irradiated with the ultraviolet light L with high directivity. Therefore, in the present embodiment, alteration of the panel 100 due to the irradiation of the ultraviolet light L is effectively suppressed, and thus it is possible to further prevent a substance that inhibits the curing of the adhesive 200 from being generated by the alteration of the panel 100.

Third Embodiment

[A] Configuration of Adhesive Application Apparatus

Figure 7:
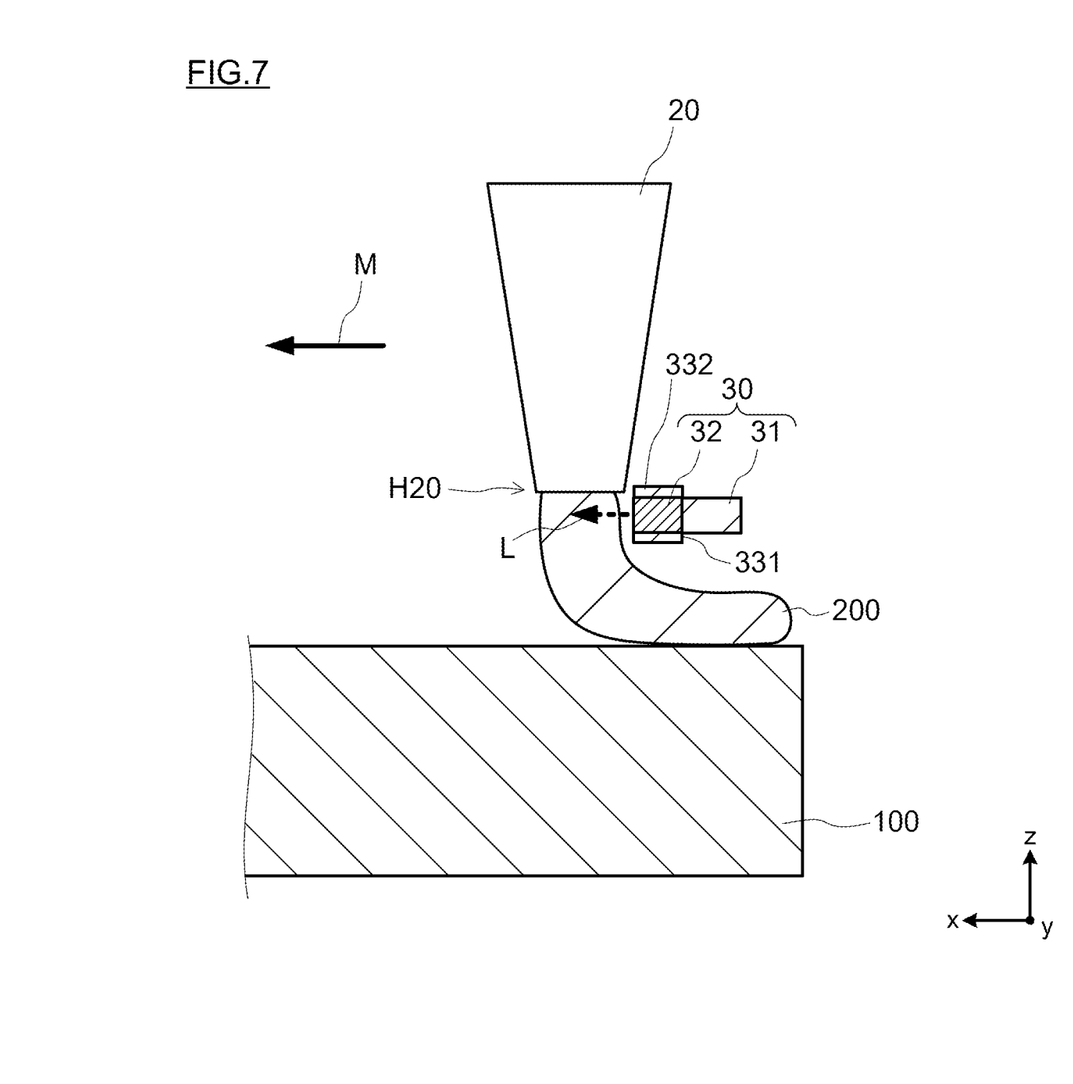
FIG. 7 is a view schematically illustrating a substantial part of a configuration of an adhesive application apparatus according to a third embodiment.

A configuration of an adhesive application apparatus according to a third embodiment will be explained by using FIG. 7. FIG. 7 illustrates parts similar to those in FIG. 3.

As illustrated in FIG. 7, the present embodiment is different from the first embodiment (refer to FIG. 3), and it further includes a pair of ultraviolet shielding plates 331, 332. Except for this point and relevant points, the present embodiment is similar to the first embodiment. For this reason, explanation of overlapped matter will be appropriately omitted.

As illustrated in FIG. 7, the pair of ultraviolet shielding plates 331, 332 are provided to surfaces, orthogonal to the mounting surface S10, of the ultraviolet transmission part 32. Specifically, the pair of ultraviolet shielding plates 331, 332 are provided to an upper surface and a lower surface, respectively, which are arranged in the vertical direction z in the ultraviolet transmission part 32, and they shield the ultraviolet light L emitted from the upper surface and the lower surface, respectively, of the ultraviolet transmission part 32.

Concretely, one ultraviolet shielding plate 331 is provided to the lower surface of the ultraviolet transmission part 32. In other words, the one ultraviolet shielding plate 331 is provided between the ultraviolet transmission part 32 and the mounting surface S10, and it shields the ultraviolet light L that travels from the ultraviolet transmission part 32 toward the mounting surface S10. In contrast to this, the other ultraviolet shielding plate 331 is provided to the upper surface of the ultraviolet transmission part 32, and it shields the ultraviolet light L that travels upward from the ultraviolet transmission part 32.

The pair of ultraviolet shielding plates 331, 332 are metal plates, for example, and they reflect the ultraviolet light L, to thereby shield the ultraviolet light L. Other than the above, it is also possible that the pair of ultraviolet shielding plates 331, 332 are black plate bodies, for example, and are configured to absorb the ultraviolet light L, to thereby shield the ultraviolet light L.

[B] Summary (Operation, Effect, and so on)

As described above, in the present embodiment, the ultraviolet shielding plates 331, 332 shield the ultraviolet light L emitted from the upper surface and the lower surface, respectively, of the ultraviolet transmission part 32. Therefore, in the present embodiment, alteration of the panel 100 due to the irradiation of the ultraviolet light L is effectively suppressed, and thus it is possible to further prevent a substance that inhibits the curing of the adhesive 200 from being generated by the alteration of the panel 100.

[C] Modified Example

In the above-described embodiment, the explanation was given of the case where the pair of ultraviolet shielding plates 331, 332 are provided to the upper surface and the lower surface, respectively, of the ultraviolet transmission part 32, but the embodiment is not limited to this. It is also possible that the ultraviolet shielding plate is provided to either the upper surface or the lower surface of the ultraviolet transmission part 32. In order to prevent the panel 100 from being irradiated with the ultraviolet light L, it is preferable to provide at least the ultraviolet shielding plate 331 to the lower surface of the ultraviolet transmission part 32.

Fourth Embodiment

[A] Configuration of Adhesive Application Apparatus

Figure 8:
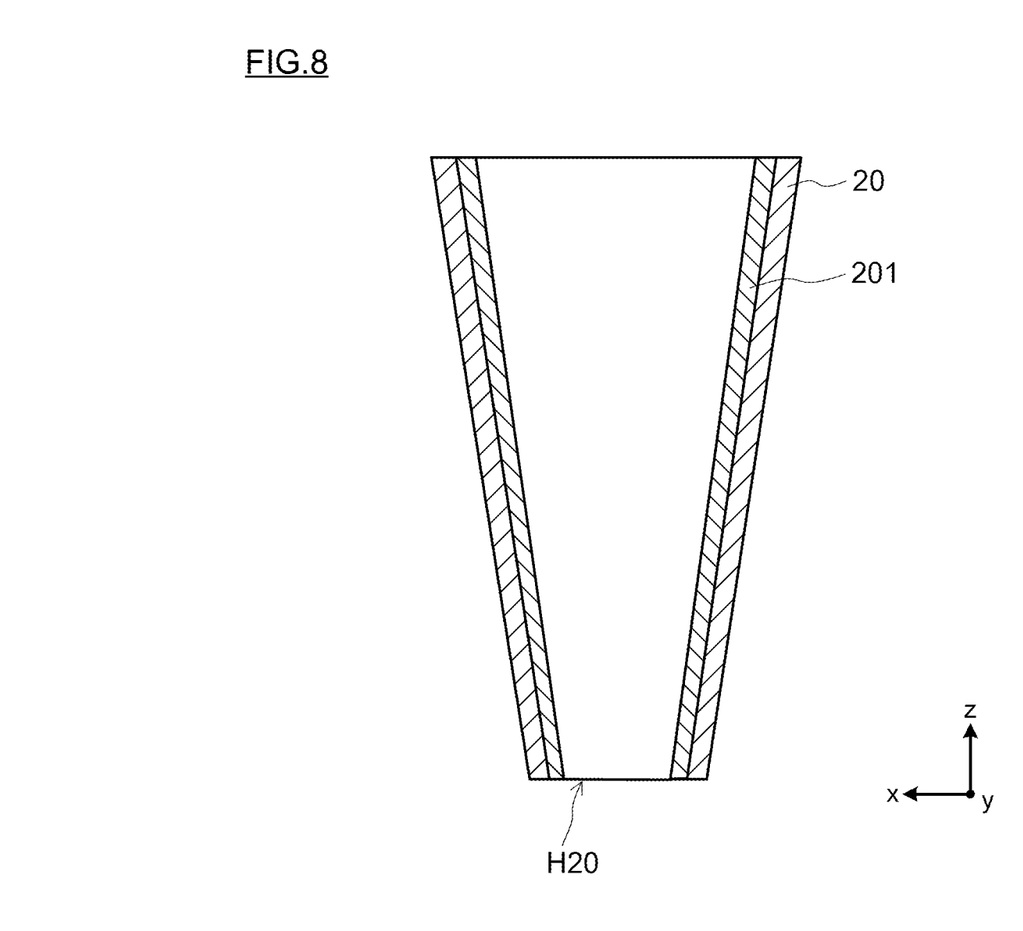
FIG. 8 is a view schematically illustrating a substantial part of a configuration of an adhesive application apparatus according to a fourth embodiment.

A configuration of an adhesive application apparatus according to a fourth embodiment will be explained by using FIG. 8. FIG. 8 illustrates a cross section of the adhesive dosing unit 20 in an enlarged manner.

As illustrated in FIG. 8, the present embodiment is different from the first embodiment (refer to FIG. 3) in that an ultraviolet absorbing layer 201 is formed. Except for this point and relevant points, the present embodiment is similar to the first embodiment. For this reason, explanation of overlapped matter will be appropriately omitted.

The ultraviolet absorbing layer 201 is formed on an inner surface of the adhesive dosing unit 20. The ultraviolet absorbing layer 201 is a black layer, for example, and is configured to absorb the ultraviolet light L.

[B] Summary (Operation, Effect, and so on)

As described above, in the present embodiment, the ultraviolet absorbing layer 201 is formed on the inner surface of the adhesive dosing unit 20, so that even if the ultraviolet light L irradiated by the ultraviolet irradiation unit 30 (refer to FIG. 3) enters the inside of the adhesive dosing unit 20, the ultraviolet light L is absorbed by the ultraviolet absorbing layer 201. As a result of this, in the present embodiment, it is possible to prevent occurrence of curing of the adhesive 200 in the inside of the adhesive dosing unit 20.

Fifth Embodiment

[A] Configuration of Adhesive Application Apparatus

Figure 9:
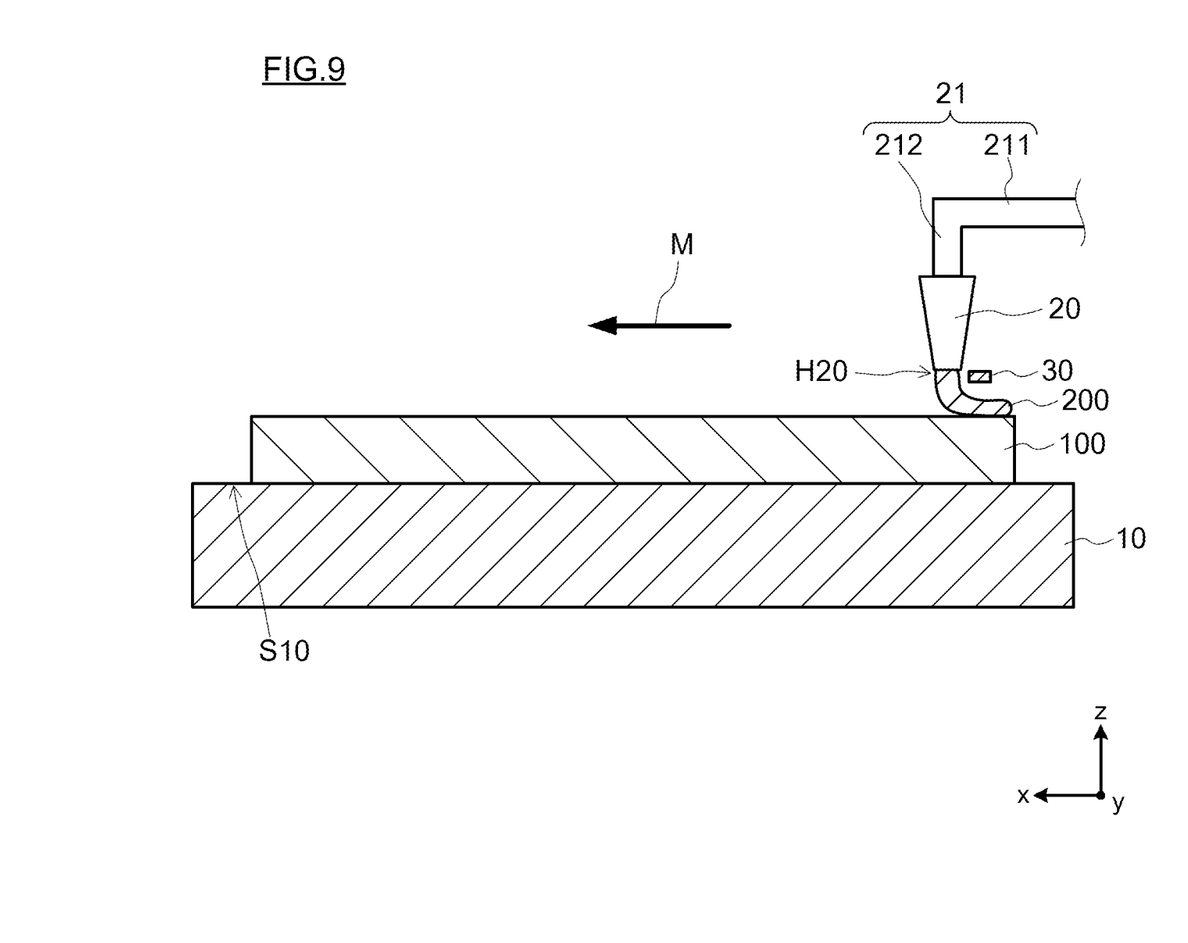
FIG. 9 is a view schematically illustrating a substantial part of a configuration of an adhesive application apparatus according to a fifth embodiment.

A configuration of an adhesive application apparatus according to a fifth embodiment will be explained by using FIG. 9. FIG. 9 illustrates parts similar to those in FIG. 1.

As illustrated in FIG. 9, the present embodiment is different from the first embodiment (refer to FIG. 1) in a shape of the adhesive pipe 21 that feeds the adhesive 200 to the adhesive dosing unit 20. Except for this point and relevant points, the present embodiment is similar to the first embodiment. For this reason, explanation of overlapped matter will be appropriately omitted.

In the present embodiment, the adhesive pipe 21 includes a part that extends along the mounting surface S10. Here, the adhesive pipe 21 includes a first adhesive pipe part 211 and a second adhesive pipe part 212. The first adhesive pipe part 211 extends in the first horizontal direction x along the mounting surface S10. The second adhesive pipe part 212 extends in the vertical direction z orthogonal to the mounting surface S10, an upper end side thereof is connected to the first adhesive pipe part 211, and a lower end side thereof is connected to the adhesive dosing unit 20. The adhesive pipe 21 is configured to dose the adhesive 200 to the adhesive dosing unit 20 in a manner that the adhesive 200 sequentially flows through the first adhesive pipe part 211 and the second adhesive pipe part 212.

[B] Summary (Operation, Effect, and so on)

As described above, in the present embodiment, the adhesive pipe 21 includes the part that extends along the mounting surface S10. The direction along the mounting surface S10 is similar to the direction of the ultraviolet light L with which the adhesive 200 is irradiated. For this reason, the ultraviolet light L is unlikely to enter the part, of the adhesive pipe 21, that extends along the mounting surface S10, so that it is possible to effectively suppress the occurrence of curing of the adhesive 200 in the adhesive pipe 21.

EXPLANATION OF REFERENCE SIGNS

10 . . . mounting table, 20 . . . adhesive dosing unit, 21 . . . adhesive pipe, 30 . . . ultraviolet irradiation unit, 31 . . . ultraviolet light source, 32 . . . ultraviolet transmission part, 100 . . . panel (adherend), 200 . . . adhesive, 201 . . . ultraviolet absorbing layer, 211 . . . first adhesive pipe part, 212 . . . second adhesive pipe part, 300 . . . panel, 321 . . . first ultraviolet transmission path 321, 322 . . . second ultraviolet transmission path 322, 331 . . . ultraviolet shielding plate, 331, 332 . . . ultraviolet shielding plate, H20 . . . adhesive dosing port, S10 . . . mounting surface

What is claimed is:

1. An adhesive application apparatus for applying a delayed-ultraviolet-curable adhesive to a surface of an adherend, the adhesive application apparatus comprising:
    a mounting table having a mounting surface for mounting the adherend thereon;
    an adhesive dosing unit for applying the adhesive to the surface of the adherend mounted on the mounting table by discharging the adhesive from an adhesive dosing port; and
    an ultraviolet irradiation unit for irradiating the adhesive dosed from the adhesive dosing port with ultraviolet light, wherein
    the ultraviolet irradiation unit is oriented to irradiate the adhesive with the ultraviolet light in a direction substantially parallel to the mounting surface before the adhesive dosed from the adhesive dosing port is applied to the surface of the adherend.

2. The adhesive application apparatus according to claim 1, wherein:
    the ultraviolet irradiation unit includes:
    an ultraviolet light source; and
    an ultraviolet transmission part for transmitting the ultraviolet light generated by the ultraviolet light source; and
    the adhesive is irradiated with the ultraviolet light transmitted by the ultraviolet transmission part along the mounting surface.

3. The adhesive application apparatus according to claim 2, wherein:
    the ultraviolet transmission part includes:
    a first ultraviolet transmission path; and
    a second ultraviolet transmission path to which the ultraviolet light generated by the ultraviolet light source is transmitted via the first ultraviolet transmission path; and
    the second ultraviolet transmission path has a value of refractive index which is closer to that of the adhesive, when compared to that of the first ultraviolet transmission path with respect to that of the adhesive.

4. The adhesive application apparatus according to claim 2, wherein an ultraviolet shielding plate is provided to a surface, orthogonal to the mounting surface, of the ultraviolet transmission part.

5. The adhesive application apparatus according to claim 1, further comprising an ultraviolet absorbing layer that absorbs ultraviolet light at an inner surface of the adhesive dosing unit.

6. The adhesive application apparatus according to claim 1, further comprising an adhesive pipe for feeding the adhesive to the adhesive dosing unit, wherein the adhesive pipe includes a part that extends along the mounting surface.

7. The adhesive application apparatus according to claim 3, wherein an ultraviolet shielding plate is provided to a surface, orthogonal to the mounting surface, of the ultraviolet transmission part.

8. The adhesive application apparatus according to claim 2, further comprising an ultraviolet absorbing layer that absorbs ultraviolet light at an inner surface of the adhesive dosing unit.

9. The adhesive application apparatus according to claim 3, further comprising an ultraviolet absorbing layer that absorbs ultraviolet light at an inner surface of the adhesive dosing unit.

10. The adhesive application apparatus according to claim 4, further comprising an ultraviolet absorbing layer that absorbs ultraviolet light at an inner surface of the adhesive dosing unit.

11. The adhesive application apparatus according to claim 2, further comprising an adhesive pipe for feeding the adhesive to the adhesive dosing unit, wherein the adhesive pipe includes a part that extends along the mounting surface.

12. The adhesive application apparatus according to claim 3, further comprising an adhesive pipe for feeding the adhesive to the adhesive dosing unit, wherein the adhesive pipe includes a part that extends along the mounting surface.

13. The adhesive application apparatus according to claim 4, further comprising an adhesive pipe for feeding the adhesive to the adhesive dosing unit, wherein the adhesive pipe includes a part that extends along the mounting surface.

14. The adhesive application apparatus according to claim 5, further comprising an adhesive pipe for feeding the adhesive to the adhesive dosing unit, wherein the adhesive pipe includes a part that extends along the mounting surface.

\* \* \* \* \*